Oct. 22, 1940.   S. B. GAHM   2,218,573
MOTOR AND TRANSMISSION THEREFOR
Filed June 14, 1938   12 Sheets-Sheet 1
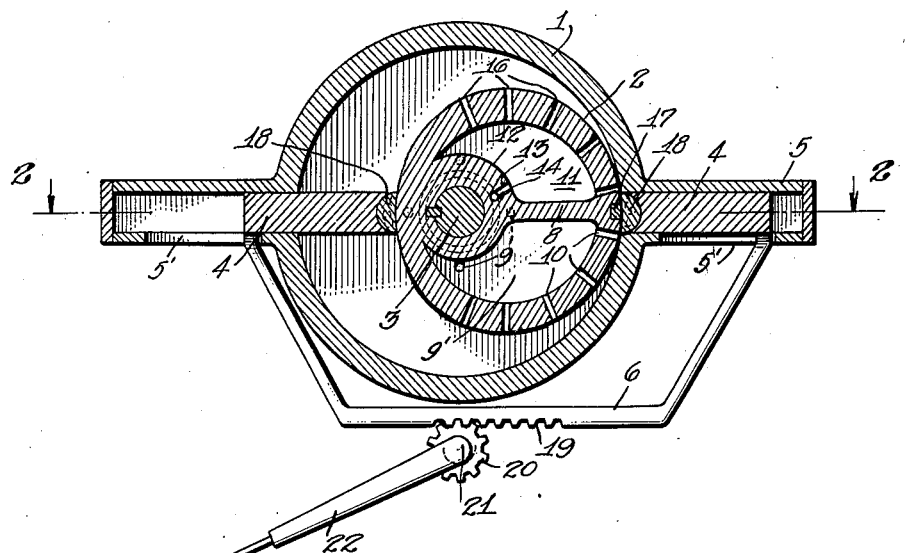
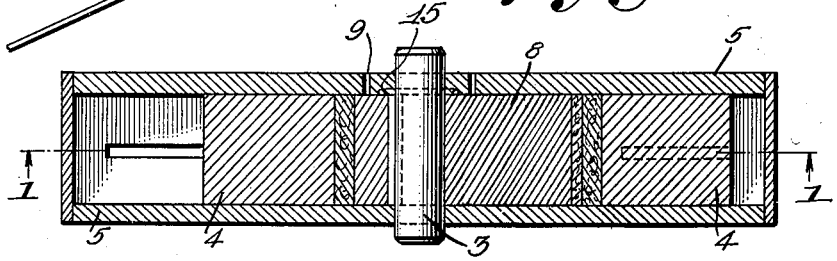
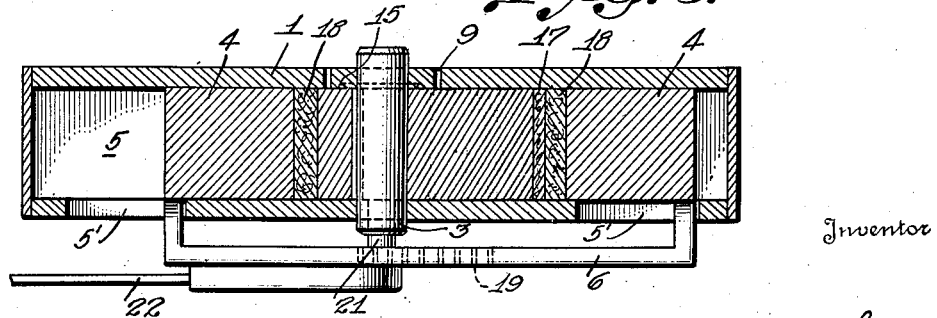
Inventor
Samuel Bernard Gahm Oct. 22, 1940.   S. B. GAHM   2,218,573
MOTOR AND TRANSMISSION THEREFOR
Filed June 14, 1938   12 Sheets-Sheet 2

Inventor
Samuel Bernard Gahm

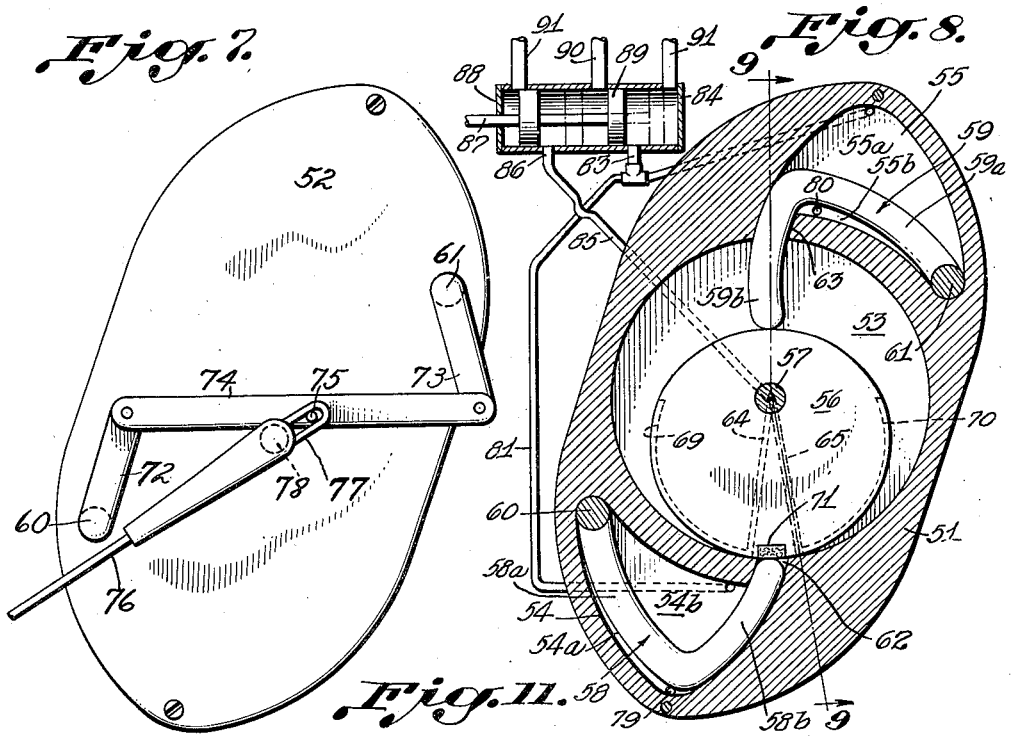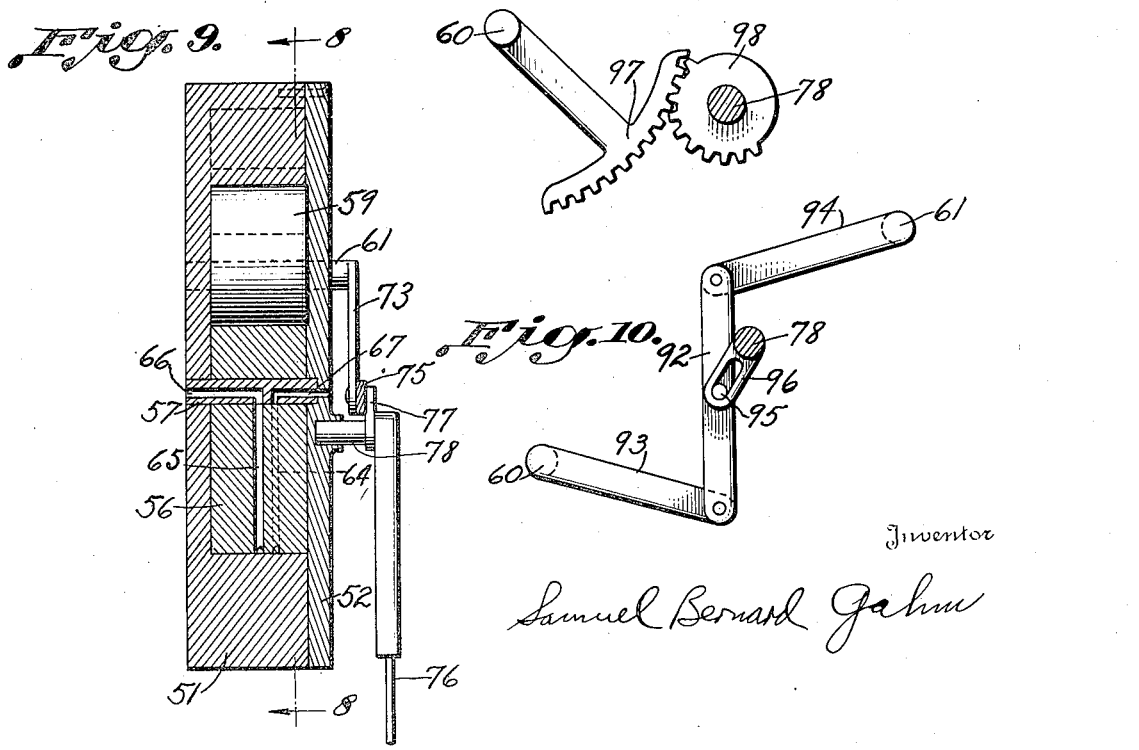

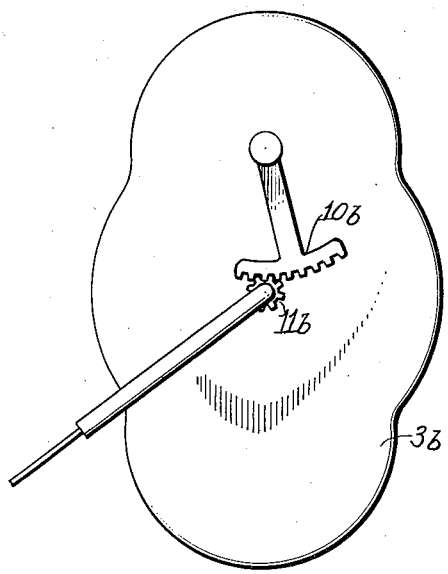
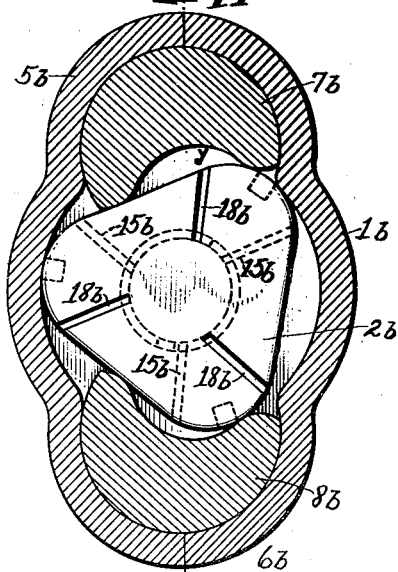
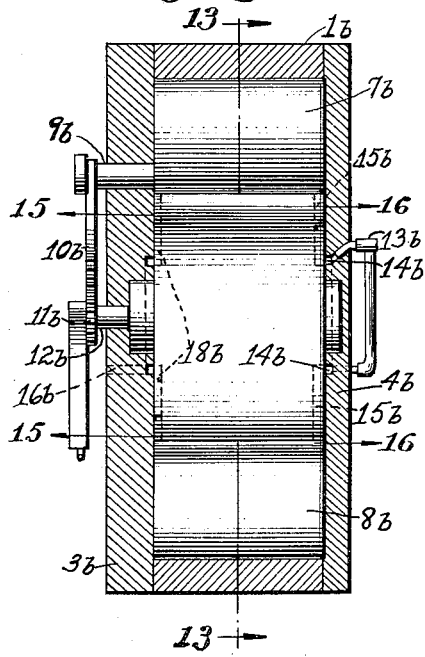
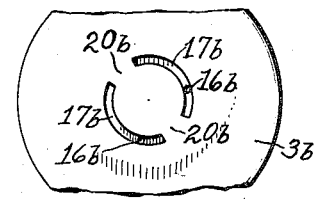
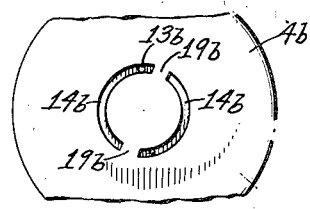

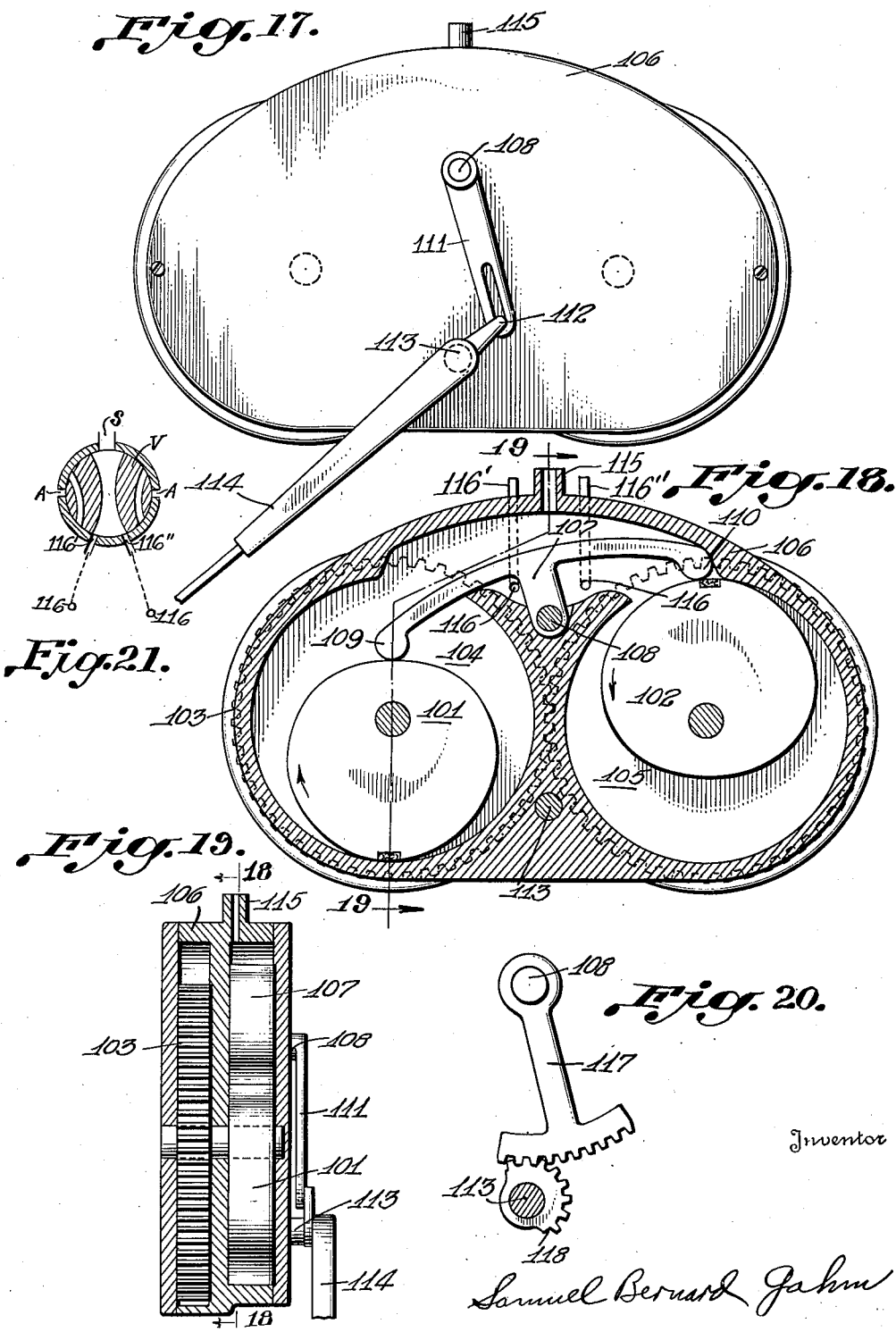

Oct. 22, 1940.　　　　S. B. GAHM　　　　2,218,573
MOTOR AND TRANSMISSION THEREFOR
Filed June 14, 1938　　12 Sheets-Sheet 6
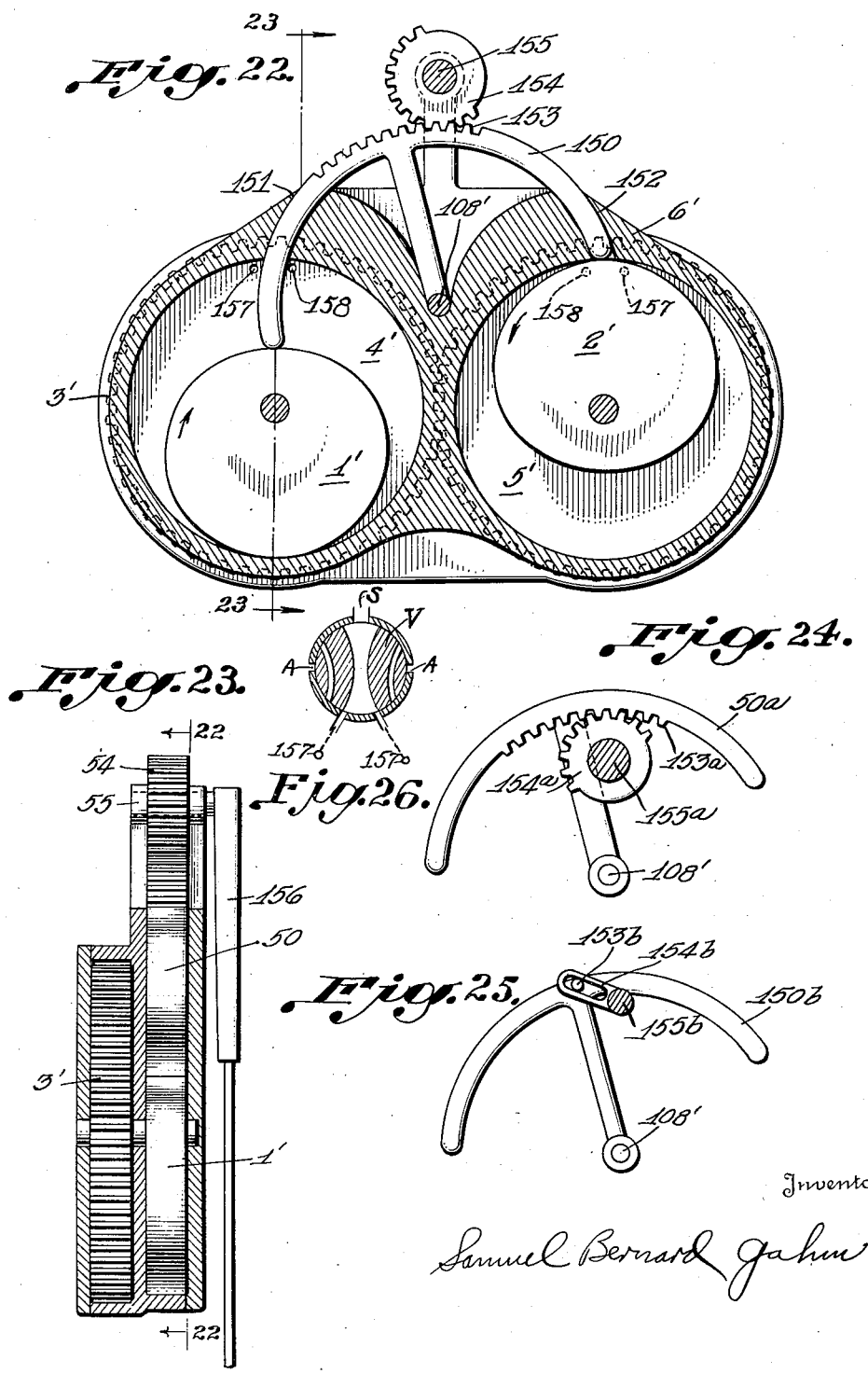

Oct. 22, 1940.  S. B. GAHM  2,218,573
MOTOR AND TRANSMISSION THEREFOR
Filed June 14, 1938  12 Sheets-Sheet 7
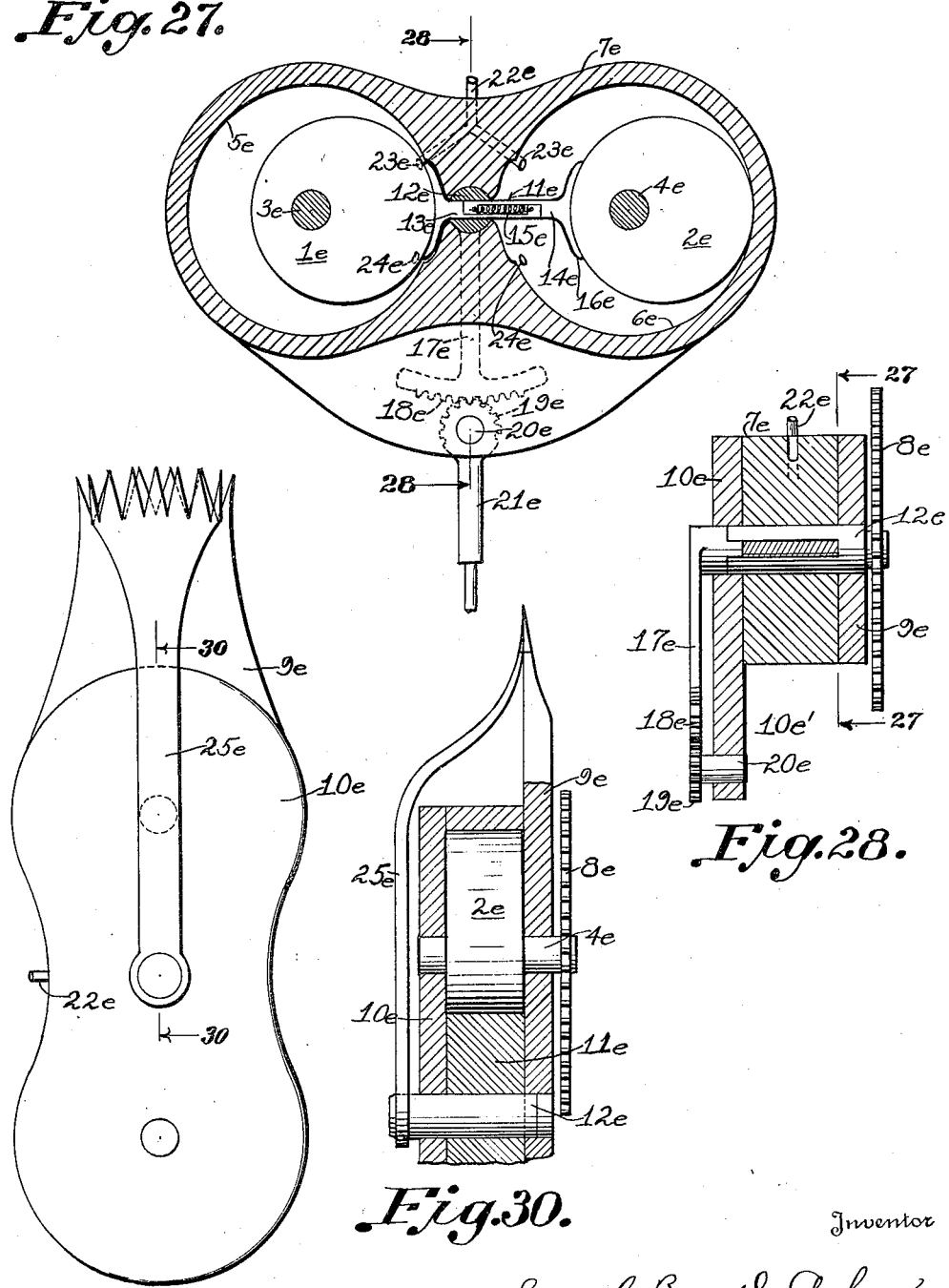

Oct. 22, 1940.  S. B. GAHM  2,218,573
MOTOR AND TRANSMISSION THEREFOR
Filed June 14, 1938    12 Sheets-Sheet 8

Inventor
Samuel Bernard Gahm

Oct. 22, 1940.　　　　S. B. GAHM　　　　2,218,573
MOTOR AND TRANSMISSION THEREFOR
Filed June 14, 1938　　　12 Sheets-Sheet 9
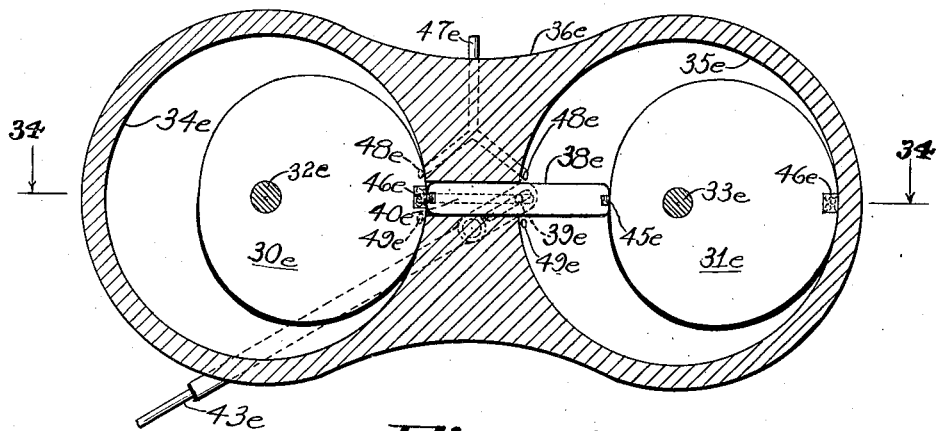
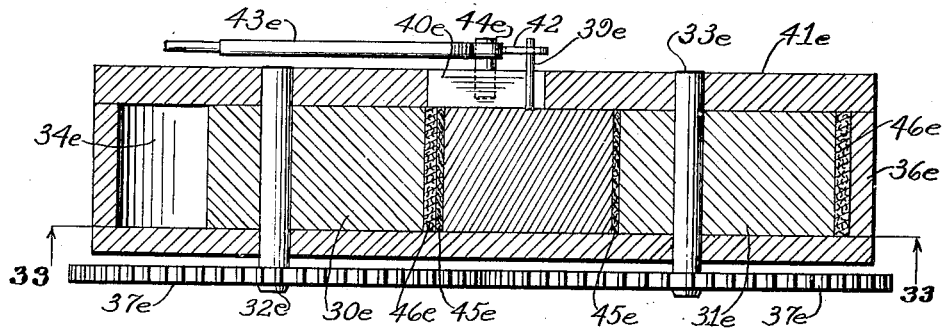
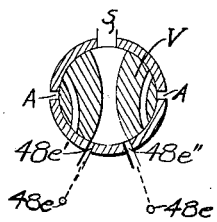
Inventor
Samuel Bernard Gahm Oct. 22, 1940.  S. B. GAHM  2,218,573
MOTOR AND TRANSMISSION THEREFOR
Filed June 14, 1938   12 Sheets-Sheet 10

Inventor
Samuel Bernard Gahm

Oct. 22, 1940.  S. B. GAHM  2,218,573
MOTOR AND TRANSMISSION THEREFOR
Filed June 14, 1938   12 Sheets-Sheet 11

Inventor
Samuel Bernard Gahm

Oct. 22, 1940.　　　S. B. GAHM　　　2,218,573
MOTOR AND TRANSMISSION THEREFOR
Filed June 14, 1938　　12 Sheets-Sheet 12
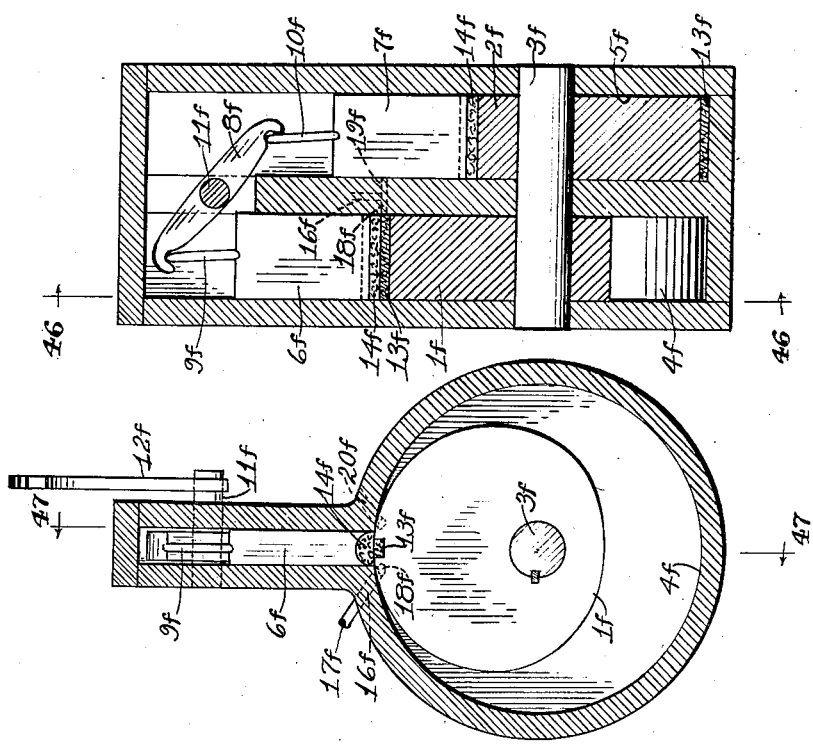
Inventor
Samuel Bernard Gahm Patented Oct. 22, 1940

2,218,573

UNITED STATES PATENT OFFICE 2,218,573

MOTOR AND TRANSMISSION THEREFOR

Samuel Bernard Gahm, Queens Village, N. Y.

Application June 14, 1938, Serial No. 213,677

17 Claims. (Cl. 121—67)

This invention relates broadly to the combination of an engine and transmission mechanism for converting rotary motion of the engine into reciprocating or oscillating motion of the power output shaft. It is for use in driving any device that requires a reciprocating or oscillating motion. Some applications for such a motion are in driving windshield wipers, grass shears, hair or wool clippers, signalling means on vehicles, etc. These uses are merely examples and are not meant to exhaust the many uses to which this invention may be put.

This invention relates more specifically to various types of rotary expansible chamber fluid motors having abutments which are reciprocated or oscillated by the rotors as they rotate and from which abutments output power is taken off either directly or is multiplied, depending on the device to be driven.

An object of the invention is to provide a reciprocating or oscillating drive from a motor which does away with the necessity of valves as distinct elements and therefore eliminates the often complicated mechanisms for reversing the valves to cause reversal of the motor. Snap actions and the many parts therefor to cause valve reversals are eliminated and with that is eliminated the annoying click caused by the snap action upon each reversal of the valve.

Another object is to provide simple and positive parking means for the oscillating shaft on either limit of its motion on some of the mechanisms disclosed below when they are employed to drive windshield wipers or signal devices.

The various structures described below are not to be construed as limitations but only as examples of how my invention may be carried out. Most of the examples to which the invention is applied are shown as windshield wiper blade arms but these are not meant to be limitations of use. The description will disclose how other devices may be driven and what alterations, if any, are necessary for driving such devices.

It is to be noted that any differential pressure may be used as the driving medium for the disclosed structures without any change whatever in the structures. If suction is used then the rotor will rotate in one direction and if pressure is applied to the same port, the rotor will rotate in the opposite direction. Although most of the disclosed structures are described as operating on suction it is to be understood that positive pressure may be employed without any changes.

Other obvious and inherent advantages of my invention will become apparent as the description of the various structures of my invention proceeds.

Figure 1 shows a sectional view taken through line 1—1 of Figure 2 of the first modification.

Figure 2 shows a sectional view taken through line 2—2 of Figure 1.

Figure 3 is a sectional view similar to Figure 2 but showing a modified drive for the output power take off shaft.

Figure 7 is a side elevation of another modification.

Figure 8 is a sectional view through line 8—8 of Figure 9.

Figure 9 is a sectional view through line 9—9 of Figure 8.

Figures 10 and 11 are two modifications of output power take off means of the motor shown by Figures 7 to 9.

Figure 12 shows a side elevation of another modification.

Figure 13 is a sectional view on line 13—13 of Figure 14.

Figure 14 is a sectional view on line 14—14 of Figure 13.

Figures 15 and 16 are sectional views on line 15—15 and 16—16, respectively, of Figure 14.

Figure 17 is a side elevation view of another modification.

Figure 18 is a sectional view on line 18—18 of Figure 19 with the rotors and abutment shown in elevation.

Figure 19 is a sectional view on line 19—19 of Figure 18.

Figure 20 is a modification of the output power take off drive shown in Figure 17.

Figure 21 is a diagrammatic showing of a valve design and pipe connections therefor for producing parking of the wiper blade on either side or for continuous operation thereof.

Figure 22 is a sectional view of another modification on line 22—22 of Figure 23.

Figure 23 is a sectional view on line 23—23 of Figure 22.

Figures 24 and 25 are modified forms of output power take off drives for the motor shown by Figure 22.

Figure 26 is a diagrammatic showing like Figure 21 of a valve and piping for producing parking on either side or for continuous operation of the wiper blade of this modification.

Figure 27 is a sectional view of another modification taken on line 27—27 of Figure 28.

Figure 28 is a sectional view on line 28—28 of Figure 27.

Figure 29 is a side elevation view of a modification of the motor shown by Figure 27 as applied to hair clippers.

Figure 30 is a sectional view on line 30—30 of Figure 29.

Figure 31:
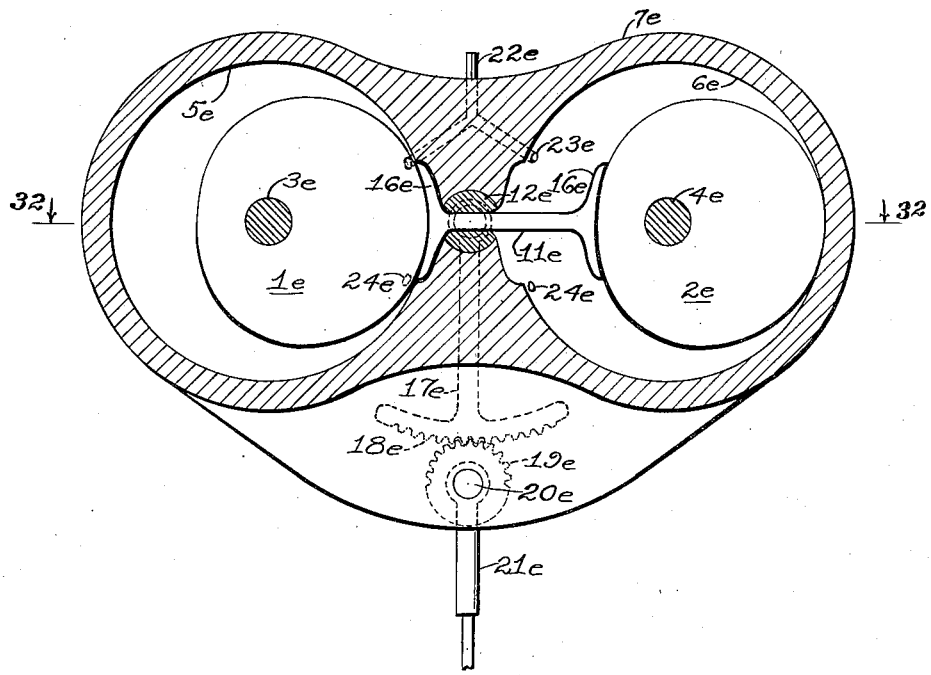
Figure 32:
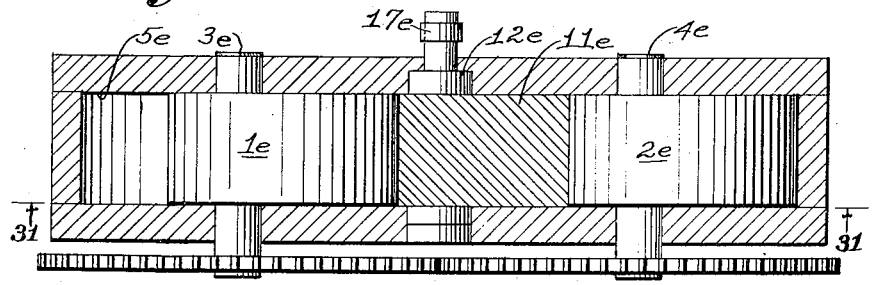

Figure 31 is a sectional view on line 31—31 of Figure 32 of a modification of the motor shown by Figure 27.

Figure 32 is a sectional view on line 32—32 of Figure 31.

Figure 33 is a sectional view of another modification taken on line 33—33 of Figure 34.

Figure 34 is a sectional view of this modification taken on line 34—34 of Figure 33.

Figure 35 is a diagrammatic showing of a valve and piping like Figure 21 for producing parking on either side or for continuous operation of the wiper blade of this modification.

Figure 36:
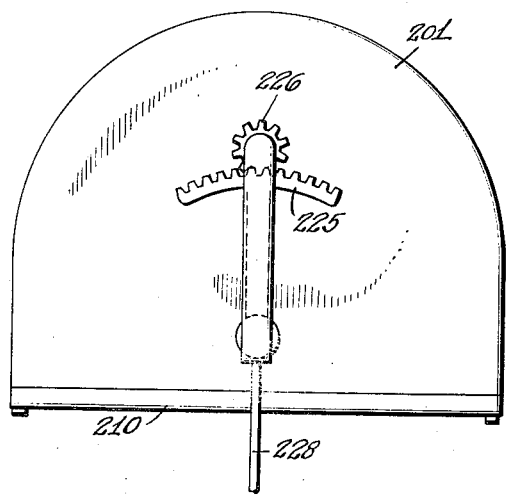

Figure 36 is a side elevation of another modification.

Figure 37:
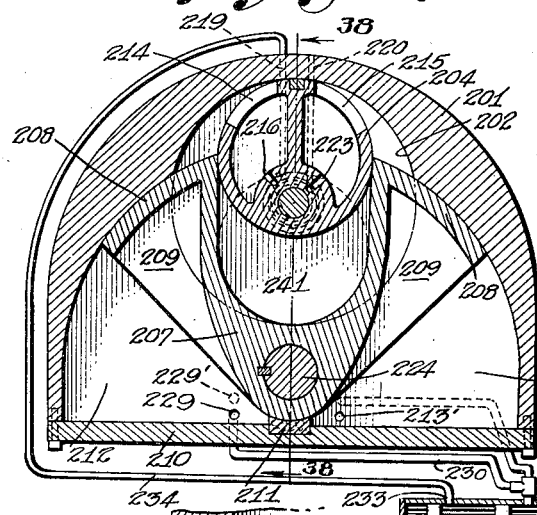
Figure 38:
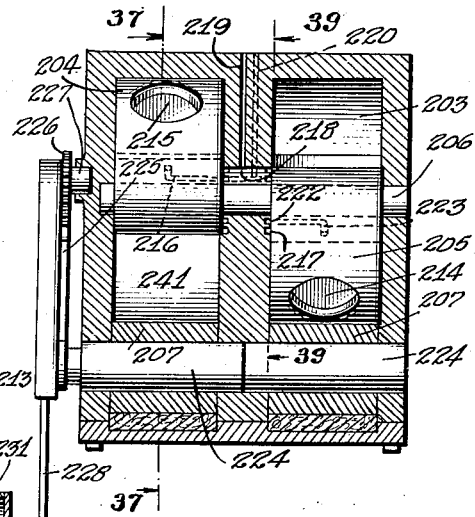

Figure 37 is a sectional view on line 37—37 of Figure 38 of this modification.

Figure 38 is a sectional view on line 38—38 of Figure 37.

Figure 39:
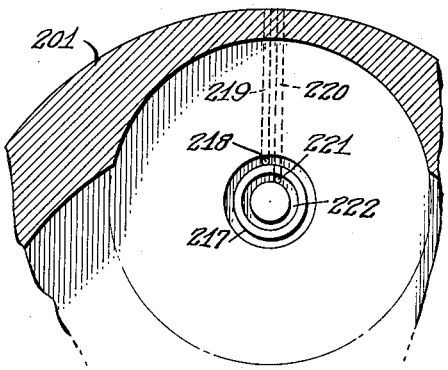

Figure 39 is a sectional view on line 39—39 of Figure 38.

Figure 40:
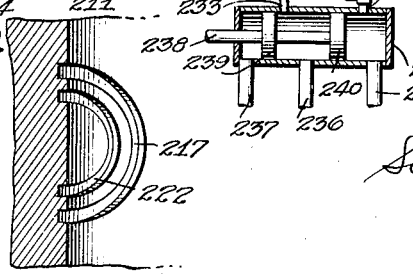

Figure 40 is a perspective view of the operating fluid supply and exhaust grooves shown on Figure 39.

Figure 41:
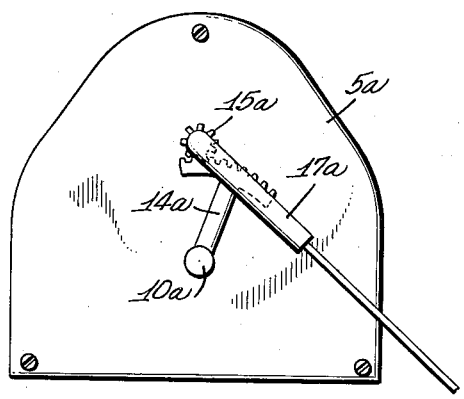

Figure 41 is a side elevation of another modification.

Figure 42:
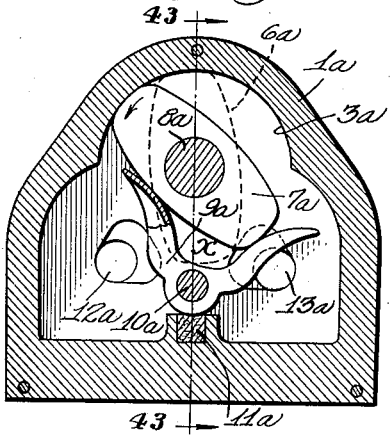
Figure 43:
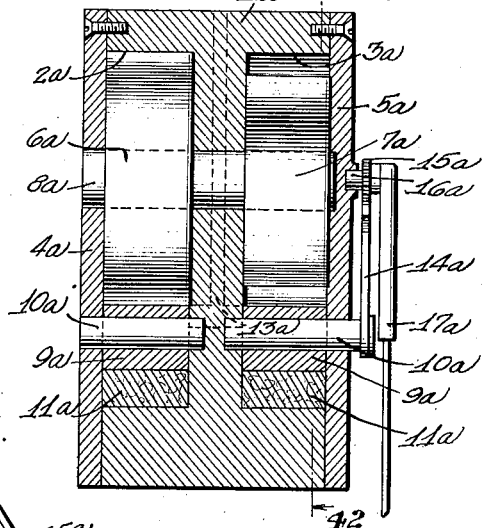

Figure 42 is a sectional view on line 42—42 of Figure 43 of this modification.

Figure 43 is a sectional view on line 43—43 of Figure 42.

Figure 44:
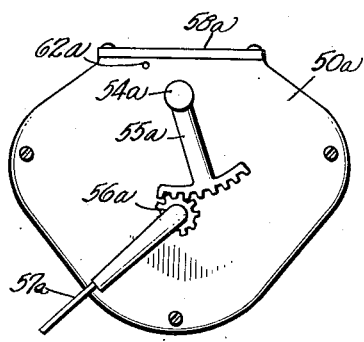

Figure 44 is a side elevation of still another modification.

Figure 45:
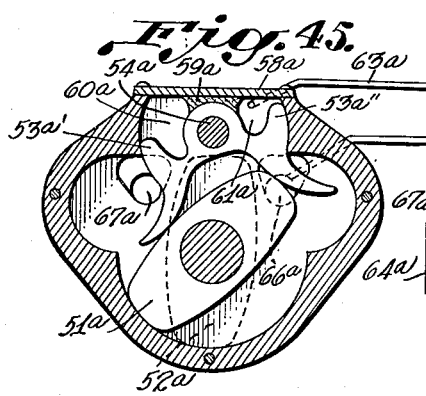

Figure 45 is a sectional view similar to Figure 42 of the modification shown by Figure 44.

Figure 46 is a sectional view of another modification taken on line 46—46 of Figure 47.

Figure 47 is a sectional view on line 47—47 of Figure 46.

Figure 48 is a diagrammatic showing like Figure 21 of a valve and piping for producing parking on either side or for continuous operation of this modification.

In the modification shown by Figures 1 to 6 the oscillation of the wiper is produced by the reciprocation of the abutments of a sliding abutment type rotary engine.

The casing 1 contains an eccentrically mounted rotor 2 on a shaft 3. The abutments 4 are slidable in abutment housings 5 and are joined together by the rack bar 6 to keep them always in contact with the rotor. The abutment housings have narrow slots 5' to provide freedom of movement of the interconnecting rack bar 6 between the abutments.

The rotor is eccentrically mounted to rotate with shaft 3. It is constructed as shown on Figure 1, hollow with a partition 8 to separate the suction source 11 (upper chamber) and atmospheric source 9' (lower chamber). Air is supplied through ports 9 in the side plates of cylinder 1 and is delivered into the cylinder chamber through a series of ports 10 which extend for a distance of about one third of the periphery of the rotor.

Since the distance between the abutments is always constant because of the interconnecting rack bar 6, the rotor 2 must be so designed that it is always contacted by the abutments as it rotates. A true circular rotor will not do this. An acceptable design for the rotor is shown in the patent to J. M. Hand #2,015,307 dated Sept. 24, 1935 on Figure 1. This shape is known as a "limacon" curve. It is to be understood that any other design for the rotor may be used which will keep the abutments always in contact with it. For example, any given curvature may be applied to one half of the rotor circumference and the other half will then be designed accordingly to give such curvature per degree of rotation as will give a constant distance across the rotor through the center of shaft 3.

It is apparent that if the interconnecting rack bar 6 be broken and joined together by a tension spring to keep the abutments in contact with the rotor and yet allow some extensibility, then the rotor may be a true circular eccentric and need not be a limacon. This makes for simplicity of manufacture. Such construction will also adjust for wear of the rotor and packings. This structure need not be illustrated as it is obvious how it may be done.

The rotor has a thickened portion 12 in chamber 11 of sufficient thickness so that ports 9 are always covered by it and thus prevent communication of air to chamber 1. A port 13 in raised portion 12 connects chamber 11 with suction pipe 14 by way of a groove 15 in the side plate of the casing 1. A series of ports 16 in the rotor, also extending around approximately one third of the rotor periphery, connect suction to the work chamber. The ports 10 and 16 may extend an equal distance in each direction from the point where the rotor contacts the casing to the point where a line drawn perpendicular to partition 8 through center of shaft 3 crosses the periphery of the rotor.

Suitable packings 17 and 18 may be provided for the rotor and abutments respectively. The reciprocating motion of the abutments is transmitted by way of teeth 19 on rack bar 6 to a gear 20 on shaft 21 which is suitably mounted on any stationary part or on a suitable extension from the casing 1, to drive the wiper blade arm 22.

In operation, suction is continuously supplied through ports 16 from 14 by way of 15, 13 and 11 to rotate the rotor in a counterclockwise direction which causes reciprocation of abutments 4 to reciprocate rack bar 6 to drive wiper arm 22 through rack 19 and gear 20.

Figure 4:
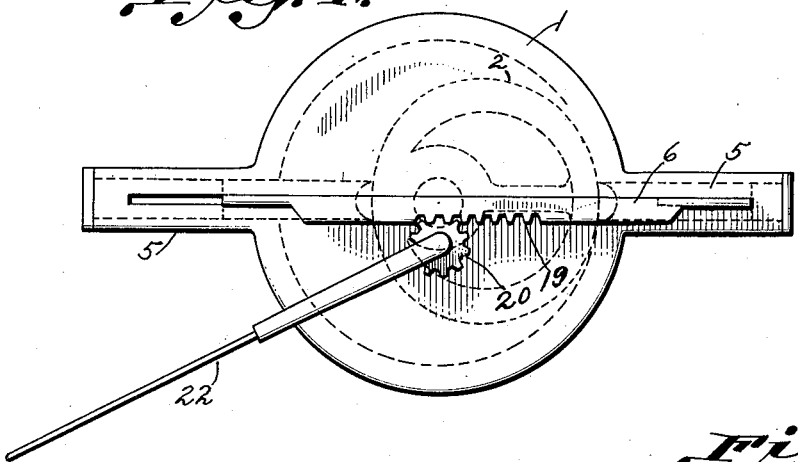
Figure 4 shows a side elevation of the modification shown by Figure 3.

The modification shown by Figures 3 and 4 merely illustrates a different point of connection for the rack bar 6 to the abutments. Rack bar 6 is here connected to the narrow edge of the abutments instead of the wide side as shown on Figures 1 and 2. The shaft 21 may then be simply mounted in a suitable bearing in the side plate of casing 1.

Figure 5:
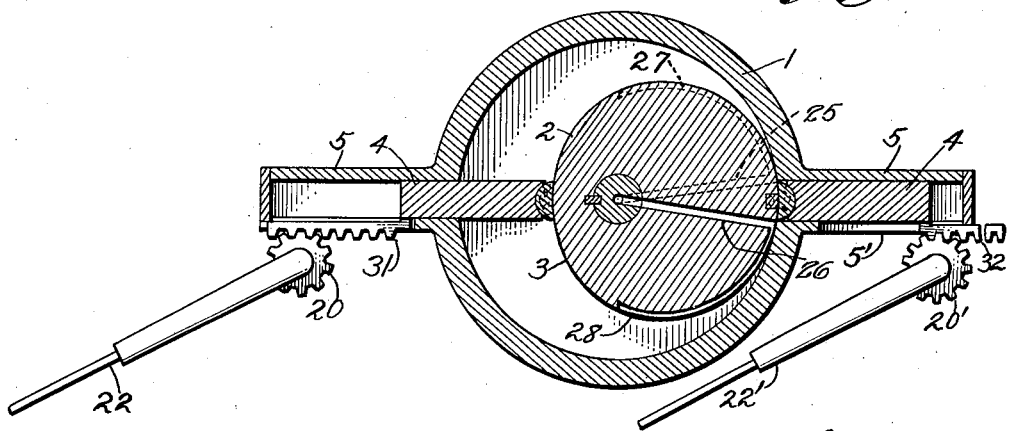
Figures 5 and 6 show vertical and horizontal central sectional views of a modification of the motor and drive of that shown by Figures 1 to 4.
Figure 6:
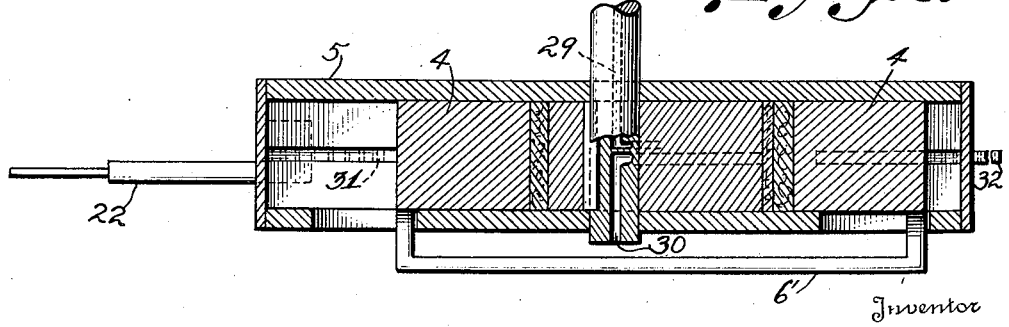

The modification shown by Figures 5 and 6 is of a simpler rotor construction and the abutments are provided with a power take off rack bar for each to drive a plurality of wiper blades.

The rotor is made solid, but is of the same peripheral contour as in Figures 1 to 4. The rotor is provided with bores 25 and 26 for suction and air respectively. Bore 25 communicates with a groove 27 on the periphery of the rotor which extends the same distance as the ports 16. Bore 26 communicates with a groove 28 which extends around the periphery of the rotor the same distance as ports 10. Suction and atmosphere are connected by way of ports 29 and 30 respectively in the shaft.

Racks 31 and 32 are connected to the abutments to drive pinions 20 and 20' respectively, for oscillating wiper blades 22 and 22', respectively.

The abutments are interconnected by a bar 6' to keep them always in contact with the rotor.

It is obvious that a signal arm or any other device may replace the windshield wiper arm shown by Figures 1 to 6.

In the modification shown by Figures 7 to 11, the casing 51 with side plate 52 forms a cylindrical rotor chamber 53 and two swinging abutment receiving chambers 54 and 55. The rotor 56 is mounted eccentrically and rigidly to shaft 57 to rotate therewith. The rotor is designed to give a simple harmonic motion to the abutments 58 and 59 that continuously follow it. Also, it is so designed that the increment of rise of one abutment per degree of rotor rotation is exactly equal to the increment of drop of the other abutment. Thus if both abutments are tied together by an outside linkage like that shown in Figures 7 or 10, the necessity of springs, cams or any other means for keeping the abutments in contact with the rotor is avoided.

The abutments are mounted rigid or integral with shafts 60 and 61 to oscillate them as the rotor rotates.

Each abutment is made up of two arms 58a, 58b and 59a, 59b. The outer arms 58b, 59b are arcuate, taken about shafts 60 and 61 as centers. Arms 58a, 59a may be any suitable shape. Arms 58b, 59b slide through slots 62 and 63 with which they make a fluid tight fit. Arms 58a, 59a fit tightly axially in chambers 54 and 55 so that they separate these chambers into two parts 54a, 54b and 55a, 55b, the purpose of which will be later explained.

Because of the arcuate shape of arms 58b, 59b, the rotor cannot take a symmetrical form in its design like that shown by Figures 1 to 6. This is because the points of contact between the abutments and rotor are not in a straight line as the rotor rotates but follow the arc of the abutments. The rotor design illustrated in Figures 1 to 6 must be altered to allow for the swing of the abutments.

The rotor has two radial ports 64 and 65 for suction and atmosphere respectively. These lead to ports 66 and 67 in the shaft 57. Radial ports 64 and 65 connect to circumferential grooves 69 and 70 in the rotor which extend symmetrically and for equal distances in opposite directions from their radial ports to a point where a line connecting them will pass through the center of shaft 57. It will be noted that the length of each groove 69 and 70 is considerably more than one quarter of the peripheral extent of the rotor. It is to be noted that the rotor and its circumferential grooves thereon shown by Figures 5 and 6 is similarly designed as described just above.

A packing and wear strip 71 is provided in the rotor at the point of its contact with the cylinder.

Arms 72, 73 rigid with shafts 60, 61 and cross link 74 provided with pin 75 provide a drive for the wiper blade 76 by way of slotted arm 77 fixed on wiper shaft 78.

If link 74 be broken and then connected together by a tension spring in a similar manner as described for Figure 1, then the rotor may be a true circular eccentric. The interconnecting spring will be strong enough to allow a driving motion to be transmitted to arm 76. It is not believed necessary to show this since it appears obvious how such a structure may be made.

Chambers 54a and 55b are always connected to atmosphere through ports 79 and 80. Chambers 54b and 55a are connected together by pipes 81 and 82 at pipe joint 83 which leads to valve chamber 84. Suction port 64 is connected by a pipe 85 to the valve chamber at 86. A valve 87 having two pistons 88, 89 interconnected together is manually operable to either connect suction pipe 90 to the port 64 in the rotor or, as shown in the dotted position, to connect suction to the abutment chambers 54b and 55a through pipes 81 and 82. In the first of these two stated valve positions, the rotor will rotate to operate the windshield wiper. At that time atmosphere is connected to chambers 54b and 55a. In the second position suction is connected to chambers 54b and 55a thus forcing the abutments to an extreme position opposite to that shown on Figure 8 and thereby causing parking of the wiper arm to one side of the windshield.

By connecting pipes 81 and 82 to chambers 54a and 55b and venting 54b and 55a to air, the wiper will be caused to park in its opposite extremity.

Figure 10 shows another type of linkage with a vertical cross link 92 connecting arms 93 and 94 to drive shaft 78 through pin 95 and slotted arm 96.

Figure 11 shows a gear sector 97 connected to drive a pinion 98 fixed to drive shaft 78. This is another alternative drive. In this modification cross links would still be necessary between the abutments to keep them in contact with the rotor.

The motor in the modification shown by Figures 12 to 16 comprises a main casing 1b in which is centrally mounted a tri-lobed rotor 2b of symmetrical design. The rotor has stub shafts which have bearings in the side walls 3b and 4b of the motor casing. The casing has upper and lower cylindrical extensions 5b and 6b into which abutments 7b and 8b closely fit. These abutments are crescent shaped and are designed to contact the rotor at all times in its rotation at, at least two points. With such design it will be noted that the abutments will always follow the rotor without necessitating any additional means for keeping them against the rotor. One of the abutments 7b has a shaft 9b connected to it at its center of rotation to move with it and thereby receive an oscillating motion imparted to the abutment. Connected rigidly to shaft 9b is gear sector 10b which meshes with a pinion 11b mounted on stub shaft 12b upon which is mounted the arm of the wiper blade. Stub shaft 12b is mounted in a bearing in the side plate 3b.

The suction to operate the motor is connected by pipe 13b to grooves 14b provided in the side plate 4b with which the slots 15b in the rotor periodically register as the rotor rotates. Air is supplied through the ports 16b in side plate 3b to the grooves 17b which register periodically with slots 18b in the rotor. Blanked out portions 20b must be provided in the air groove since at certain times in the rotation of the rotor the suction would be connected directly to air and therefore make the motor inoperative. Similarly blanked out portions 19b must be provided in the suction groove since at certain times the chamber between the rotor and main casing 1b is expanding and application of suction at those times would be a drag on the rotor.

In operation, suction is continuously connected at 13b to grooves 14b which draws air from the chambers formed between the rotor 2b and casing 1b through slots 15b to contract these chambers and cause rotation of the rotor in a clockwise direction. On the other side of each lobe an expanding chamber receives air from the atmosphere through 16b, 17b and 18b. Because of the three lobes and two abutments there is no dead center position. At all times at least one or more of the chambers is being evacuated. It is to be noted that the expanding and contracting space, marked y on Figure 2, between each abutment and the rotor also provides a work chamber which aids in the operation of the motor. The oscillation of the abutment 7b is multiplied and transmitted to the wiper shaft 12b by way of parts 9b, 10b and 11b.

Abutment 8b may also be provided with a power take-off shaft similar to 9b, although this is not shown, and two wiper blades may be operated with the proper location of each stub shaft 12b.

The rotary motor in the modification shown by Figures 17 to 21 comprises two rotors 101 and 102 geared together by gears 103 to rotate in opposite directions and to be kept in synchronism thereby. The rotors are mounted in separate cylinders 104, 105 in main casing 106 and are set in their cylinders 180 degrees out of phase with each other. A swinging abutment 107 is mounted rigid with and to oscillate shaft 108. The rotors are so designed that the ends 109 and 110 of the abutment 107 are always in contact with both rotors. The amount of rise of the abutment per degree of revolution caused by rotor 101 is exactly counterbalanced by an equal drop of the other end of the abutment caused by the rotor 102. The rotors are also designed as in the modification shown by Figures 7 to 11 to give simple harmonic motion to the abutments and to keep them always in contact with the rotors.

Shaft 108 has rigidly connected to it a slotted arm 111 into the slot of which fits a pin 112 of a windshield wiper operating shaft 113 which drives the wiper blade 114.

Suction is connected to nipple 115 and air is supplied through ports 116. The suction and air are separated by the close fitting rotors and abutment.

The ends 109 and 110 of the abutment 107 contact the housing and make a tight fit therewith when the rotors are at top dead center and continue to maintain such tight fit for a considerable distance on either side of top dead center. This prevents direct communication between suction port 115 and air port 116 a short distance after top dead center of the rotors.

A modification of the wiper drive is shown on Figure 20. The slotted arm is replaced by a gear sector arm 117 which meshes with a pinion sector 118 to drive shaft 113.

In operation, continuous suction will cause rotation of the rotors 101 and 102 in the directions shown by the arrows. Air is supplied through ports 116 to the expanding sides of the chambers between the rotor and casing. The oscillation of abutment 107 is transmitted through shaft 108, arm 111, pin 112 and shaft 113 to drive the wiper blade.

Figure 21 shows a simple and effective arrangement for parking the wiper arm of this modification on either side of its limit of motion. With this arrangement, the air and suction supply ports are reversed. Port 115 is continuously open to air and ports 116 are supplied with suction under the control of valve V of Figure 21. The valve housing has connected to it a suction port S connected to a source of suction by any suitable means, two air ports A and two pipes 116′ and 116″ leading to ports 116 in the motor. The valve V has passages cut through it as shown. With the valve in the position shown by Figure 21, suction is continuously supplied to both ports 116 and the motor will operate to drive the wiper blade back and forth. If the valve is rotated clockwise so that atmosphere is connected to 116″, suction will still be connected to 116′ because of the width of suction port S and the design of the central valve passage. Under this condition the right rotor 102 will be free since it has air on both sides of it and the left rotor still being supplied with suction will rotate until it reaches top dead center position and there stop, thus parking the wiper arm 114 on the right extremity. If the valve V is rotated in a counterclockwise direction to connect 116′ to air, 116″ will still be supplied with suction and the wiper blade will consequently be parked on its left extremity as shown in Figure 17.

It is apparent that if a signal arm having an arrow or an electric light at its end be connected in place of the wiper arm 114, that, with the valve structure of Figure 21, a left or right turn signal can be indicated or a continuous oscillating warning signal can be operated.

The modification in Figures 22 to 26 is similar to that shown by Figures 17 to 21 insofar as the rotors, gearing and motor operation is concerned. The parts that are the same are numbered as in the modification shown by Figures 17 to 21 with the addition of primes.

The swinging abutment 150 is designed on an arc of a circle about shaft 108′ and can therefore fit to slide tightly in slots 151 and 152 to provide a proper seal. The abutment 150 also has a portion 153 constructed as a gear sector which meshes with a pinion sector 154 mounted to operate shaft 155 to which is rigidly connected wiper blade 156.

Suction and air are supplied to ports 157 and 158, respectively. These ports connect into the cylinders at points slightly within the periphery of the cylinders so that each rotor at its top dead center will act to block these ports off. If these ports came into the rotor chambers at the periphery, it would make the motor inoperative because, in the top dead center position of the rotors, the suction would be connected directly to air around the rotors.

Figure 24 shows an internal gear sector 153a on abutment 150a to mesh with pinion sector 154a on wiper shaft 155a. This structure will reduce the overall height of the motor.

Figure 25 shows a pin and slot drive for the wiper shaft. Abutment 150b has pin 153b connected to move with it. Slotted link 154b has its slot cooperating with pin 153b to operate wiper shaft 155b.

Figure 26 shows a valve arrangement like that shown by Figure 21 for operating the wiper blade or for producing parking thereof in either extremity of its motion. Its operation is the same as that described for Figure 21 and need not be here repeated.

It is apparent here also that a signal arm with a light and arrow may replace the wiper blade and with the valve structure of Figure 26 can be made to indicate a continuous oscillating signal or a left or right turn signal.

In the modification shown by Figures 27 and 28 the two eccentric rotors 1e, 2e are mounted to rotate with shafts 3e, 4e in cylinders 5e, 6e of casing 7e. The rotors are arranged 180 degrees out of phase and are geared together by gears 8e to rotate in opposite directions. Side plates 9e, 10e enclose the rotors to make work chambers. Side plate 10e has an extension 10e' to provide a bearing for an output power take-off shaft to be later described.

An abutment structure 11e passes through a plug 12e in the portion of the casing 7e between the rotor chambers. Plug 12e is broken into two parts (Figure 28) to facilitate assembly. The abutment structure is composed of two similar interfitting portions 13e, 14e which are connected by a tension spring 15e to allow some extension of the length of the abutment structure and thereby keep it always in contact with the rotors. The base of each portion 13e, 14e has a long arcuate integral shoe 16e fitting snugly against the rotor surface.

Because of these long arcuate shoes fitting the surfaces of the rotor, it will be noted that as the rotors rotate in opposite directions the abutment structure must oscillate thereby oscillating the plug 12e.

Integral with plug 12e is a gear sector arm 17e having a gear sector 18e which meshes with a gear sector 19e on stub shaft 20e to which a windshield wiper arm 21e is connected.

Suction is applied through pipe 22e to ports 23e and atmosphere is connected through ports 24e. Ports 23e and 24e are arranged slightly within the periphery of the cylindrical chambers 5e and 6e so that the rotors in their top dead center positions will act to block these ports off at that time and prevent direct communication between the suction and atmospheric ports.

Figures 29 and 30 show the same motor applied to drive hair or wool clippers. Side plate 9e is extended to provide the stationary portion of the clippers and 25e is the moving clipper arm which is connected directly to plug 12e to be driven thereby.

Pressure fluid may, of course, be applied at 22e instead of suction. The rotors will then rotate in the reverse direction but the same oscillating motion will be imparted to plug 12e.

The modification shown by Figures 31 and 32 is similar in mode of operation to that shown by Figures 27 to 30. That is, the rotation of the rotors causes oscillation of the abutment and of the plug through which the abutment fits and from that to the output oscillating shaft by way of the gear sectors. The difference between these two modifications is that the rotors in Figures 31 and 32 are designed as limacon curves thereby providing at all times a constant distance between the two rotors in their rotation. The abutment can thus be of constant length, therefore simplifying the construction. The long arcuate shoes 16e would in this modification, be made of a somewhat resilient material at the surfaces contacting the rotors so that they will always be in full contact with the rotors which in this case are not circular.

If preferred, a packing of any well known construction may be placed on the rotor contacting surfaces of these shoes 16e. It is not believed necessary to show this since such structure is well known in the art.

The modification shown by Figures 33 and 34 is somewhat similar to that shown by Figures 31 and 32. In this modification the rotors are designed as limacon curves to give a constant distance between them at all times. The abutment is slidable between the rotors instead of being oscillatable.

The rotors 30e, 31e are designed as limacon curves and are mounted on shafts 32e, 33e in separate cylinder chambers 34e, 35e in casing 36e. The rotors are set 180 degrees out of phase and are geared together by gears 37e to rotate in opposite directions.

An abutment 38e of constant length is slidably mounted in the casing structure between the two rotors and makes a fluid tight sliding fit with the casing. The center of the abutment has a pin 39e fixed to it which extends through a slot 40e in side plate 41e. This pin fits into a slotted arm 42e integral with wiper arm 43e which is mounted to oscillate on stub shaft 44e.

Packings 45e are provided for the ends of the abutment and 46e for the high points of the rotors.

Suction is connected through pipe 47e to ports 48e and atmosphere comes in through ports 49e. Both sets of ports connect into cylinders 34e, 35e at points slightly inwardly of the periphery of these cylinder chambers so that they may be covered by the rotors at top dead center.

Continuous application of suction will cause rotation of the rotors in opposite directions, thereby reciprocating the abutment 38e and through pin 39e and slotted arm 42e cause oscillation of wiper arm 43e.

Figure 35 shows diagrammatically how this modification, like those shown by Figures 17 to 26, may be arranged to park the wiper arm on either side or to drive it continuously. This valve V would be placed between line 47e and the two branch pipes leading to ports 48e.

In the position shown by Figure 35 the motor will be continuously operating since both ports 48e are connected to suction. If the valve is moved clockwise to connect air to 48e'', the right hand rotor will be free and the left rotor will stop at its top dead center causing parking of the wiper arm at the left. If the valve is moved counter clockwise to connect air to 48e', the left hand rotor will be free and the right hand rotor will stop at its top dead center causing parking of the wiper arm at the right.

It is apparent that a signal light and arrow may replace the wiper arm 43e. Thus with the valve arrangement shown by Figure 35 a continuously moving signal may be given or left and right turns may be indicated.

In the modification shown by Figures 36 to 40, the casing 201 is divided into two similar motor cylinders 202 and 203 in which eccentric rotors 204, 205 are mounted fixed to shaft 206. The rotors are fixed 180 degrees out of phase. Each rotor has an abutment 207 cooperating therewith, being shaped as shown on Figure 37. The portion in which the rotor rotates is U shaped. Arms 208 are provided to make a seal with the casing and cut out portions 209 are for lightening purposes. A cover plate 210 having a packing 211 at its center to seal the base of the abutment fits on casing 201 to provide closed chambers 212 and 213, for use for a purpose to be later described.

Each rotor has two openings 214 and 215 for suction and air respectively. The suction is connected to the rotor by way of port 216, circumferential groove 217, longitudinal port 218 and radial port 219. Air is admitted through radial port 220, cross ports 221, circular groove 222 to port 223.

The abutments 207 are fixed on shafts 224. One of these shafts is extended out beyond the casing to carry the gear sector 225 which meshes with pinion 226 rigid on wiper shaft 227 to drive the blade 228.

The abutment chamber 212 of the left motor (Fig. 38) has a port 229 which is connected by a pipe 230 to a port 231 in the valve chamber 232. Chamber 213 is always connected to air by way of port 213'. The right hand motor has its abutment chamber 212 always connected to air via 229' and its chamber 213 connected by a pipe to valve port 231. The port 233 in the valve chamber is connected by pipe 234 to port 219. Pipe 236 connects the valve chamber to suction. Numeral 237 designates two air ports. Valve 238 with its pistons 239, 240 is manually shiftable to either connect suction to the motor chambers 202 and 203 to drive the wiper or to the chambers 212 (left motor) and 213 (right motor) to park the wiper in the left extremity (Figure 36).

With the valve 238 in the position shown, the motor will be continuously connected to suction to rotate rotors 204, 205 counter clockwise. Since both chambers 212 and 213 are connected to air the abutments will be free to oscillate shaft 224 to drive the wiper arm 228 through gearing 225 and 226.

It is to be noted that besides cylinders 202 and 203 being contracting and expanding work chambers, the U-shaped chambers designated as 241 are also contracting and expanding chambers and will aid in causing rotation of the rotors.

Referring to the modification shown by Figures 41 to 43, the cylinder housing 1a contains two rotor chambers 2a, 3a which are open at the sides. Side plates 4a and 5a fit over these open sides to make tight rotor chambers to house rotors 6a and 7a. The rotors are fixed to shaft 8a to rotate therewith and this shaft is rotatably mounted in suitable bearings in the housing and side plates. Each rotor has a swinging abutment 9a fixed to shaft 10a cooperating therewith. Each abutment has two arms and is designed of such curvature that both arms are always in sealing contact with the rotor so that as the rotor rotates a swinging motion is impaired to the abutment. A design for such an abutment on Figure 8 of the patent to Hutchison #2,084,846, dated June 22, 1937. A packing strip 11a is placed at the base of each abutment to separate the suction port 12a from the air port 13a. It is to be noted that the suction and air ports are made large at the point where they enter into the rotor chambers as is shown clearly by Figure 26. Thus the chamber marked x between the two arms of the abutment and the rotor acts as an expansible work chamber as it registers with the suction and air ports alternately.

The two rotors are set at 45 degree phase difference so that there is never a dead center position in which at least one of the rotors is not transmitting rotational torque to the shaft.

The oscillation of abutment shaft 10a is transmitted by way of a gear sector 14a fixed to it to drive pinion 15a on wiper blade shaft 16a to operate wiper blade 17a.

From the above description the operation appears clear. The continuous application of suction at 12a and admission of air at 13a causes rotation of the rotors which oscillates the abutments and the wiper blade is oscillated through the sector and gearing transmission.

The modification shown by Figures 44 and 45 is similar in general structure and mode of operation as that shown by Figures 41 to 43. The difference is in the design of abutments and cooperating casing therefor so that closed chambers may be formed to be used for parking of the windshield wiper.

The casing 50a contains rotors 51a, 52a set at 45 degrees phase difference. The abutments 53a, only one being shown, are fixed to shafts 54a which oscillates gear sector 55a to drive the wiper shaft pinion 56a to which the wiper blade 57a, is connected.

Each abutment is designed as shown on Figure 45. The lower part that cooperates with the rotors is designed like that shown by Figures 42. The upper part has two horn-like extensions 53a', 53a'' which are arcuate shaped at their outer portion on a curvature concentric with the shaft 54a. These extensions make a fluid tight sliding fit with complimentary extensions on the casing designed to cooperate with these extensions. A cover plate 58a carrying a packing 59a at its center fits over the top of one of the abutment chambers to make two separated expansible chambers 60a and 61a. The other abutment chamber of the adjoining motor is closed by a cover plate 58a which has no packing thus providing a single intercommunicating chamber. Preferably, the abutment that is connected to drive the wiper blade is the one arranged to have the separate chambers 60a and 61a.

The chamber 60a is always connected to atmosphere by way of port 62a through the side plate. Chamber 61a is connected through the intermediate wall between the two rotor chambers to a pipe 63a which connects to valve chamber 64a. Chamber 64a has a suction pipe S and two air ports 67a' connected to it. A pipe 65a leads from this valve chamber to connect suction to ports 66a in the rotor chambers. This pipe 65a is also connected by way of the intermediate wall. Ports 67a are atmospheric ports which also are bored in the intermediate wall. The valve 68a in valve chamber 64a is merely a starting and parking valve.

In the position shown suction is provided to the rotor chambers through pipe 65a at ports 66a causing rotation of the rotors in a counter clockwise direction. This causes oscillation of the abutments which motion is transmitted to the wiper blade through the gear sector and pinion. There is no drag on the abutments since at this time air is supplied to abutment chamber 61a through pipe 63a. Abutment chamber 60a is always supplied with air. The other abutment not being provided with a packing 59a has a single balanced chamber. When valve 68a is pushed to the left, suction is then supplied to chamber 61a only and air is supplied to ports 66a. This abutment will therefore be swung to its farthest position counter clockwise which will swing the wiper to its farthest clockwise position causing parking of the windshield wiper blade.

In the modification shown by Figures 46 to 48, the rotors 1f and 2f are designed as limacon curves. They are mounted rigid with a single shaft 3f, which passes through two rotor chambers 4f, 5f. The rotors have sliding abutments 6f, 7f cooperating therewith so that as the rotors rotate the abutments reciprocate. The rotors are set 180 degrees out of phase so that the abutments also move in cycles 180 degrees out of phase. A walking beam 8f interconnects the abutments by way of pins 9f, 10f so that motion of the abutments is transmitted to give an oscillating motion to the walking beam. Beam 8f is mounted integral with output power take-off shaft 11f which is set in suitable bearings in the sides of the abutment housing and to which shaft is connected the gear sector arm 12f for taking off power. Packings 13f are provided for the rotors and 14f for the abutments.

Suction is connected to both rotor chambers through the dividing plate 15f between them in which is bored passages 16f and to which passages is connected suction pipe 17f. The suction passages terminate in the rotor chambers in ports 18f, 19f. Atmosphere is also connected to the rotor chambers through bores 20f in the dividing plate. The suction and air delivery ports connect the rotor chambers at points spaced slightly inwardly of the peripheries of the cylinders 4f, 5f so that the rotors will cover these ports when at top dead center and prevent direct communication between them.

The mode of operation seems apparent from the above description. With the continuous application of suction the rotors rotate to cause reciprocation of the abutments, oscillation of the walking beam and oscillation of the power output take-off gear sector arm 12f.

The limacon curve for the rotors will keep both abutments always in contact with the rotors since the amount of rise of one abutment per degree of revolution of its rotor will be exactly equalled by the amount of drop of the other abutment per degree of revolution of its rotor.

The diagrammatic valve showing of Figure 48 illustrates how this modification may be started and stopped with parking provisions on either extremity of movement of walking beam 8f. In the valve position shown by Figure 48, suction S is delivered to both rotor chambers through 18f, 19f to continuously drive the motor. If valve V is rotated clockwise to connect atmosphere to 19f from A, then suction is connected to 18f only and rotor 1f will be rotated until top dead center where it will be stalled and will park the walking beam in the position shown by Figure 47. If valve V is rotated counterclockwise to connect atmosphere to 18f from A, then suction is connected to 19f only and rotor 2f will be rotated to its top dead center position where it will stall to park the walking beam on the opposite side from that shown by Figure 47.

It is apparent that a signal light and arrow may be connected to be driven by arm 12f and a continuous warning signal, or left and right turns may be indicated by the arrangement disclosed. Or a windshield wiper arm may be connected to 12f which may be parked at either extremity at will.

I claim:

1. The combination of a motor and a mechanical output power transmission therefor comprising an abutment type rotary motor, having a rotor and abutment and mechanical output power take-off means connected to said abutment.

2. A power transmission mechanism comprising a rotary motor having a rotor and casing therefor, an abutment cooperating with said rotor to be reciprocated thereby and mechanical output power take-off means connected to said abutment.

3. The combination of a motor and a reciprocating output power transmission therefor comprising a rotary expansible chamber motor having a rotor, a casing for the rotor, an abutment in the casing cooperating with the rotor and being reciprocated thereby as it rotates and mechanical output power take-off means connected to the abutment.

4. A rotary expansible chamber motor, a rotor and casing therefor, an abutment cooperating with the rotor to be reciprocated thereby and mechanical output power take-off means connected to said abutment.

5. The combination of a motor and an oscillating output power transmission therefor comprising a rotary expansible chamber motor having a rotor, a casing for the rotor, an abutment in the casing cooperating with the rotor and being oscillated by the rotor as it rotates and output power take-off means connected to the abutment.

6. An expansible chamber rotary fluid motor, a rotor and casing therefor, a plurality of abutments cooperating with the rotor, and mechanical output power take-off means connected to the abutments.

7. The combination of a motor and a mechanical output power transmission therefor comprising an expansible chamber rotary fluid motor having a rotor and casing therefor, a plurality of abutments cooperating with said rotor against which the fluid reacts to cause continuous rotation of the rotor, and mechanical output power take-off means connected to the abutments.

8. An expansible chamber rotary fluid motor, a plurality of rotors, a casing for housing said rotors, an abutment cooperating with both rotors, and output power take-off means connected to the abutment.

9. An expansible chamber type rotary fluid motor, a plurality of rotors, a casing for housing said rotors, an abutment cooperating with both rotors, means for keeping the abutment always in contact with the rotors and output power take-off means connected to the abutment.

10. The combination of a motor and a mechanical output power transmission therefor comprising an expansible chamber rotary fluid motor, a plurality of rotors, a casing for housing both said rotors, an abutment cooperating with both rotors against which the fluid reacts to cause continuous rotation of the rotors and output power take-off means connected to the abutment.

11. The combination of a motor and a mechanical output power transmission therefor comprising an expansible chamber rotary fluid motor, a plurality of rotors mounted on separate shafts, a casing for housing both rotors to provide separate chambers therefor, a single abutment cooperating with both rotors, means for keeping said abutment always in contact with both rotors so that the abutment is reciprocated as the rotors rotate, and output power take-off means connected to the abutment.

12. The combination of a motor and a mechanical output power transmission therefor comprising an expansible chamber rotary fluid motor, a plurality of rotors, a casing for housing said rotors to provide a chamber for each, an abutment cooperating with each rotor against which the fluid reacts to cause rotation of the rotor, the abutments being reciprocated by the rotation of the rotors, and output power take-off means connected to the abutments.

13. The combination of a motor and a mechanical output power transmission therefor comprising an expansible chamber rotary fluid motor, a plurality of rotors, a casing for housing said rotors to provide a chamber for each, said rotors arranged to rotate in synchronism and out of phase, a separate abutment cooperating with each rotor against which the fluid reacts to cause rotation of each rotor, the abutment being reciprocated thereby and output power take-off means connected to the abutments.

14. The combination of a motor and an output power transmission therefor comprising an abutment type rotary motor having a rotor, said rotor having a high and low point, an abutment contacting the rotor to be reciprocated thereby as the rotor rotates, fluid intake and exhaust ports cooperating with the rotor to supply pressure fluid to and exhaust from the motor, and reciprocating output power take-off means connected to said abutment.

15. The combination of a rotary motor and an output power transmission therefor, a cylinder, a rotary having a high and a low point rotatable in said cylinder, an abutment contacting the rotor to be reciprocated thereby as the rotor rotates, differential pressure fluid intake and exhaust means for supplying pressure fluid to and exhausting from the motor, said rotor controlling the supply and exhaust of the differential pressure fluid and functioning as the distributing valve for the motor, and output power take-off means connected to the abutment.

16. In a differential pressure fluid rotary expansible chamber motor, a casing forming a plurality of cylinders, a rotor in each of said cylinders, abutment means cooperating with both rotors against which the pressure fluid reacts to cause rotation of the rotors, and means for venting one of said cylinders to atmosphere to cause stopping of the motor in a given position.

17. In a differential pressure fluid rotary expansible chamber motor, a casing forming a plurality of cylinders, a rotor in each of said cylinders, abutment means cooperating with both rotors against which the pressure fluid reacts to cause rotation of the rotors, and means for venting one of said cylinders to atmosphere to cause stopping of the motor when the rotor in the other of said cylinders reaches a dead center position.

SAMUEL BERNARD GAHM.